Dec. 18, 1934.  W. G. BUNKER  1,984,826
MACHINE FOR HARVESTING POTATOES AND THE LIKE
Filed July 13, 1933  3 Sheets-Sheet 1
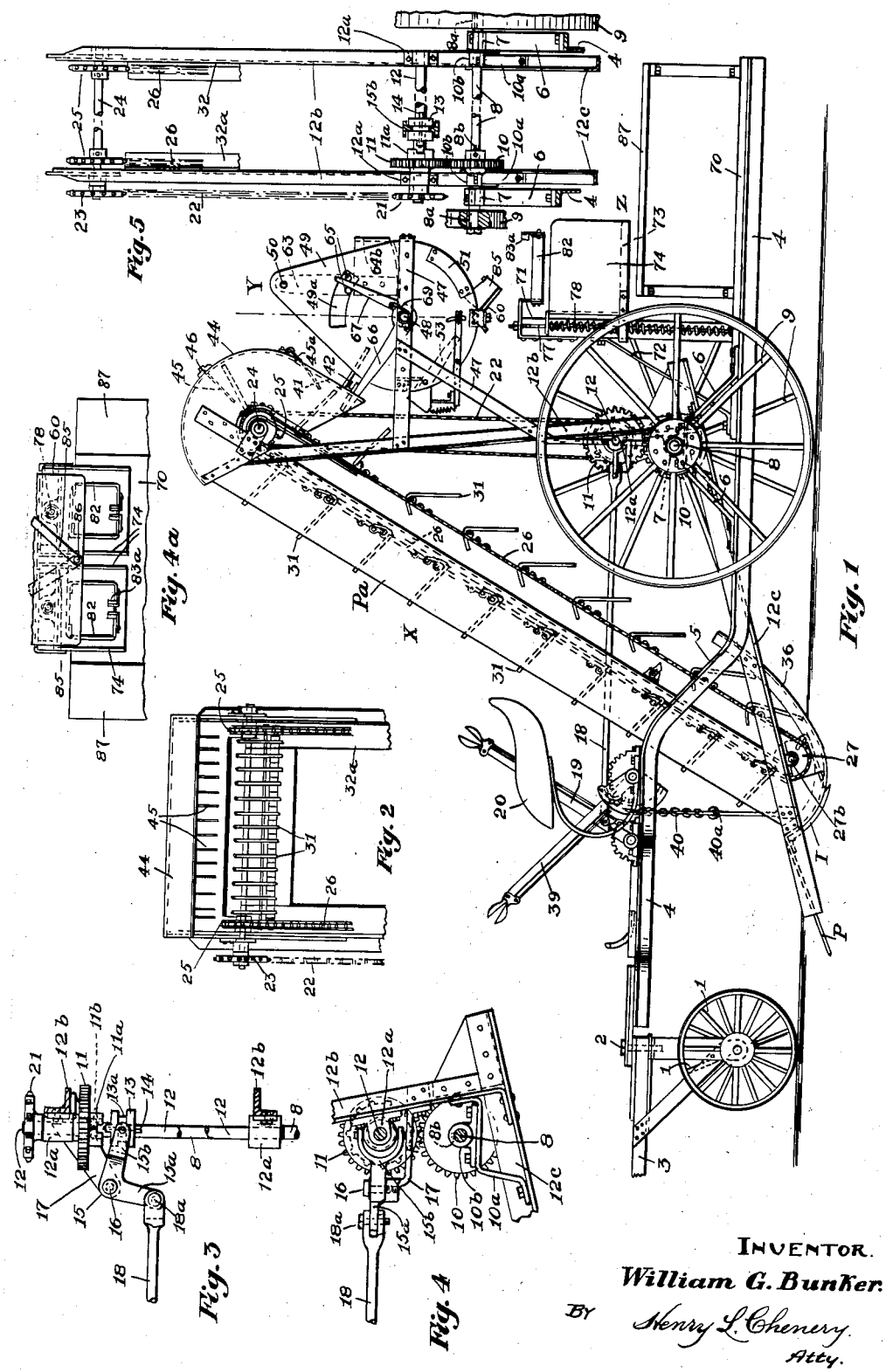
INVENTOR.
William G. Bunker.
BY Henry L. Chenery.
Atty.

Dec. 18, 1934.  W. G. BUNKER  1,984,826
MACHINE FOR HARVESTING POTATOES AND THE LIKE
Filed July 13, 1933   3 Sheets-Sheet 2
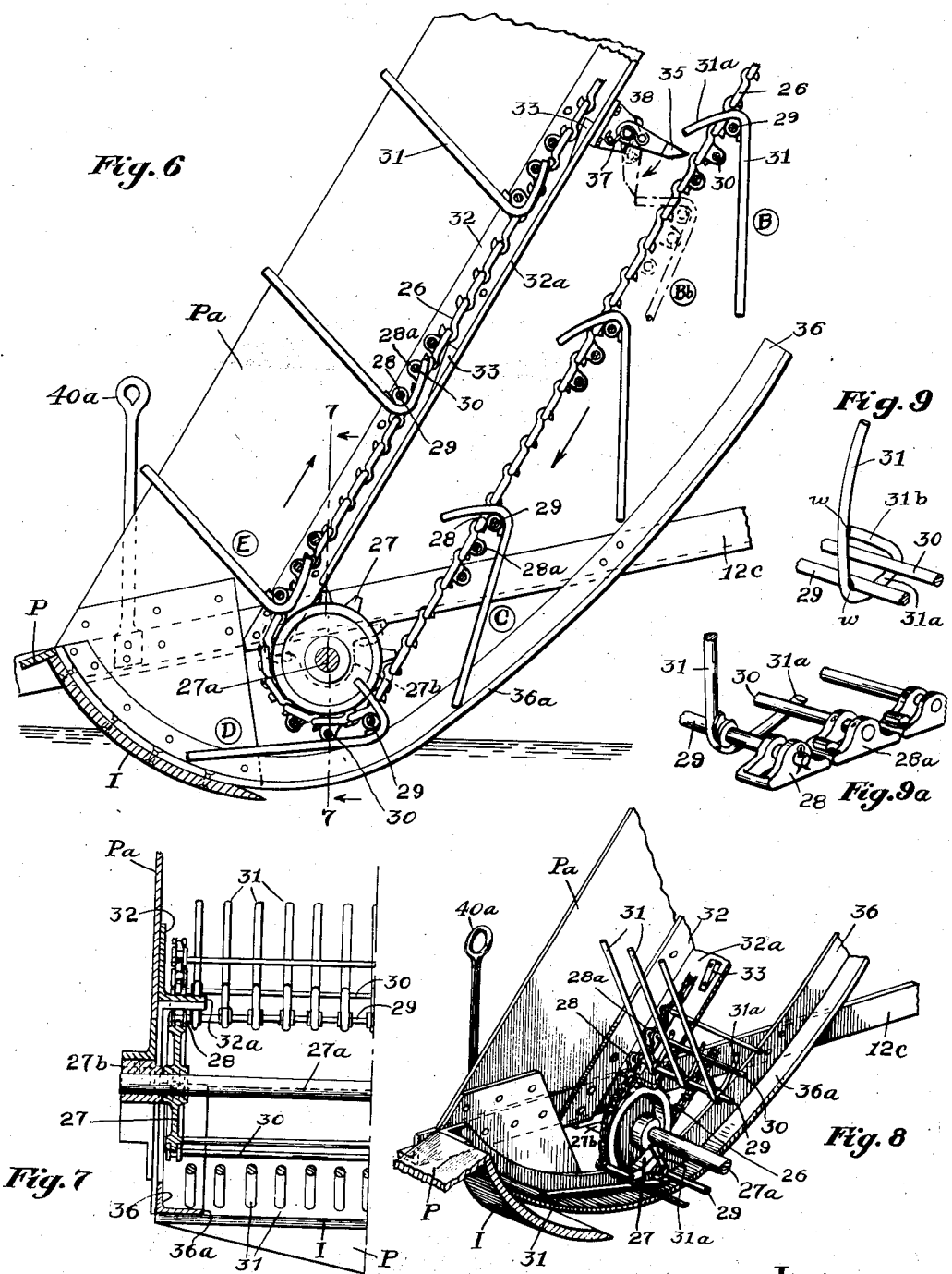
INVENTOR.
William G. Bunker
BY Henry L. Chenery
Atty.

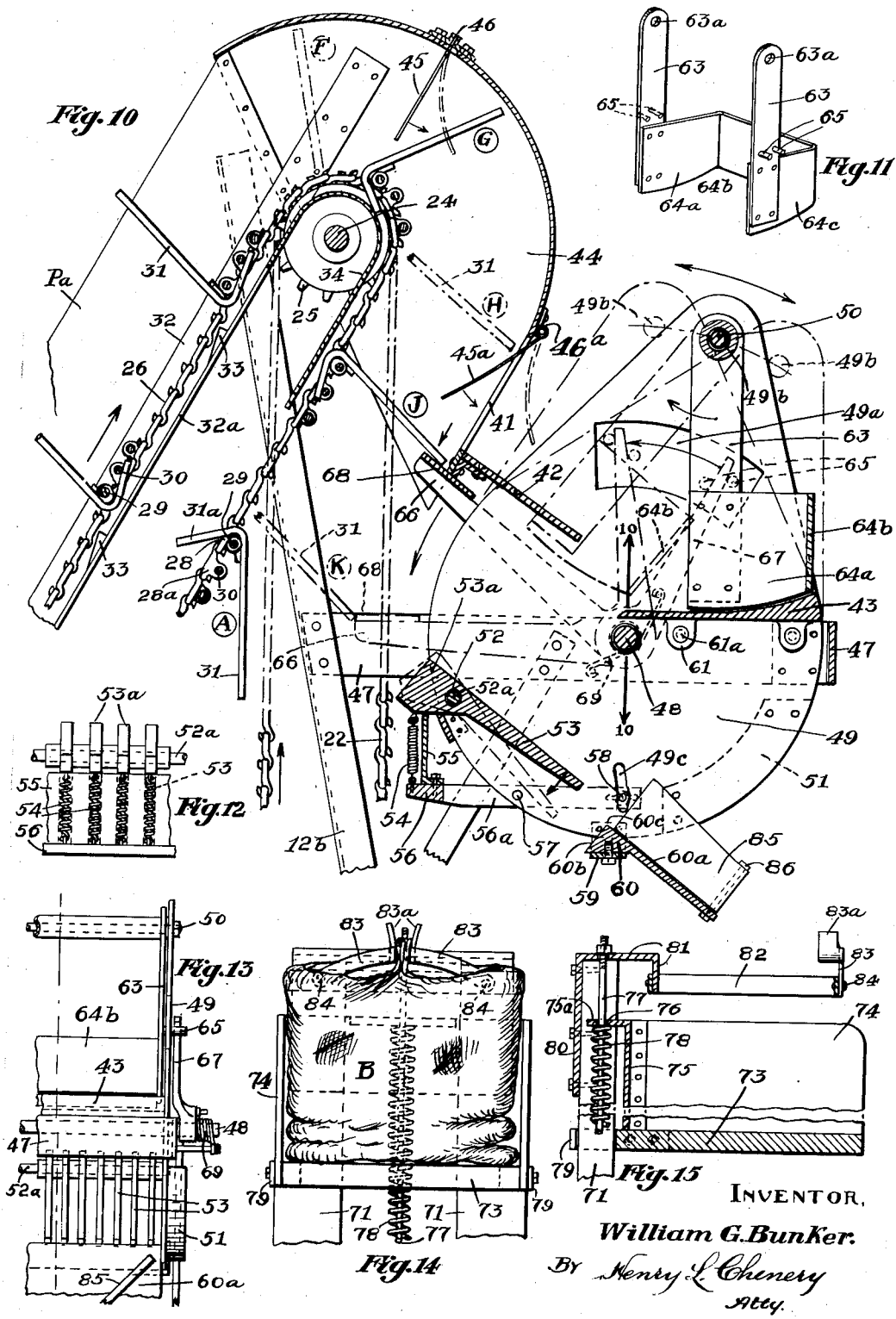

Patented Dec. 18, 1934

1,984,826

UNITED STATES PATENT OFFICE 1,984,826

MACHINE FOR HARVESTING POTATOES AND THE LIKE

William G. Bunker, Augusta, Maine

Application July 13, 1933, Serial No. 680,273

11 Claims. (Cl. 55—51)

The invention hereinafter to be described relates, in general terms, to potato harvesting machines in which there are embodied two principal units, a plow-equipped conveyor which digs and elevates the potatoes, and a separator which segregates the potato-tops and rocks which may have been elevated with the potatoes. Further than this there are provided facilities for bagging the potatoes immediately after and while being discharged from the separator unit.

In the broadest conception of my invention any power agent suitable for the purpose may be employed to carry out the objects of the invention, but in the present instance I have elected to illustrate and describe it in connection with and in its application to a horse-drawn vehicle in which the two large rear wheels are employed as the immediate source of power to actuate the mechanisms.

Characteristic features of my potato harvesting machine distinguishing it from conventional practice in constructing agricultural machinery of this class reside in the control over the movement and positioning of the elevating tines as they pass under the lower and over the upper sprocket shafts of the elevating conveyor; in the function exercised by these tines in actuating other elements in the combination; in improvements in the construction and operation of the separator fingers whereby they are more sensitively balanced and respond with greater alacrity to the impact of the falling potatoes and foreign material; in the pendulum-like suspension of the separator unit which provides a substantially constant and uniform angle of inclination from perpendicular of the separator fingers regardless of the contour of the ground over which the potato digger is operating, and in other features and advantages which will be disclosed as the description of the invention proceeds.

In the accompanying drawings I have illustrated an embodiment of my invention which, at the present time, I consider preferable to other possible forms in which the invention might be carried out.

In the drawings—

Fig. 1 is a side elevation of my harvester;

Fig. 2 is a fragmentary front elevation thereof;

Figs. 3 and 4 are plan and end elevation, respectively, of the clutch mechanism;

Fig. 4a is a plan view of the bagging end of the machine;

Fig. 5 is a front end elevation of the driving mechanism;

Fig. 6 is a sectional elevation of the lower end of the elevating conveyor, drawn to a larger scale;

Fig. 7 is a section taken in a plane coincident with the line 7—7, Fig. 6, but showing the left-hand side of the harvester;

Fig. 8 is a view, in perspective, of the parts shown in Fig. 6;

Fig. 9 is an alternative form for the elevating tines;

Fig. 9a shows a plurality of the attachment links in the conveyor chain with one tine mounted on a cross-bar;

Fig. 10 is a sectional elevation, drawn to an enlarged scale, of the upper end of the elevating and separating units;

Fig. 11 shows a perspective of the feed-box;

Fig. 12 is an end elevation of a plurality of separator fingers;

Fig. 13 is a fragmentary rear end elevation of the separator unit;

Fig. 14 is a rear end elevation of one of the bagging units, and

Fig. 15 is a longitudinal sectional elevation thereof.

Similar reference characters are employed to identify like parts in all the different views of the drawings.

In Fig. 1 of the drawings I show a side view of my potato harvester which comprises the elevating unit X, the separating unit Y and the bagging unit Z.

It is quite apparent that the essential elements of the invention are capable of being mounted on any one of various combinations of structure to serve the purpose and attain the objects sought in the invention.

As depicted, 1, 1 are the front wheels, 2 the king-pin from which they swing and 3 the tongue or pole of the vehicle. The chassis, or superstructure-supporting frame includes two side angle bars 4, the forward portion being disposed at a higher elevation than the rearward, with an intermediate inclined part 5.

Secured to each frame 4 is a bracket member 6 mounted on each of which is a bearing 7. Operating in these bearings is an axle 8 on which, by means of keys 8a, are fixed the large rear wheels 9 of the vehicle. The tractive force of these wheels when the vehicle is under way supplies the power required to actuate the elevator and separator mechanisms. It will be understood, however, that should the harvester be made a motor propelled and motor actuated machine the essence of my invention would still remain in the structure which in the present instance I prefer to mount on a horse-drawn vehicle.

In Figs. 3, 4 and 5 are illustrated the intermediate drive elements of my potato digging machine. Fixedly mounted on the axle 8, by key 8b, is a gear 10, meshing with which is a gear 11 loosely mounted on the shaft 12 which operates in bearings 12a secured to the upright angle members 12b. The lower ends of these angle members, 12b, are secured, respectively, to the plow beams 12c (see Fig. 4), and on the latter are secured respectively, the brackets 10a which in turn are attached to the bearings 10b in which operates the shaft 8. It will thus be seen that a large proportion of the weight of the units X and Y is carried by the bearings 10b, suspended from the shaft 8.

The hub 11a of the gear 11 forms one portion of a jaw clutch, the other part being incorporated in the sliding sleeve 13 which operates over a feather key 14. The member 13 has a circumferential groove 13a by means of which the member may be actuated in and out of engagement with the part 11a, and a collar 11b within the hub 11a prevents endless movement of the gear 11.

A bell crank lever 15, having two arms 15a and 15b, is pivotally mounted, at 16, on the bracket 17. The arm 15b operates on sleeve 13 and arm 15a makes connection, at 18a, with the rod 18 extending forwardly to a ratchet lever 19 near the driver's seat 20. Actuation of lever 19 throws the clutch parts for operating the conveyor in and out of engagement. When the clutch is "out" the gear 11 simply revolves on its shaft 12 while the vehicle is under way.

On the shaft 12 is a sprocket wheel 21 which, through the agency of the sprocket chain 22, rotates the sprocket wheel 23 which is fixed on the shaft 24. Also fixed on shaft 24 are two sprocket wheels 25, 25, from which chains 26, 26 extend, respectively, to sprocket wheels 27, 27, these latter being secured on the shaft 27a operating in bearings 27b, 27b at the extreme lower end of the conveyor unit X.

At spaced intervals on the chains 26 are attachment links 28 revoluble in which and extending from one chain to the other is a rod 29. On these rods are a plurality of tines 31 secured thereon in any approved manner, as by pinning or electric welding.

Each tine has a foot 31a which, when the tines are travelling upwardly on the endless conveyor chains, engages the rod 30 extending from one to the other of two attachment links 28a positioned in advance of the first two mentioned.

In Fig. 9 is shown a slight modification in the form of these tines. In this instance they are slightly curved and the foot portion 31a is extended to form a connection 31b between the end of the portion 31a, as previously shown, and the main portion of the tine 31. The tine is also shown as electric welded at the points w, w. The bar 31b facilitates unloading the potatoes from the tines as they round the upper sprockets on the conveyor.

The function exercised by the feet 31a is to hold the tines from tilting backwardly when, loaded with potatoes, they rise with the conveyor chains to the top of the conveyor.

The portions of the elevator chains which are in tension travel upwardly in close proximity to the legs 32a of the angle members 32. Mounted on these legs are a plurality of chocks 33 positioned in the paths of the outwardly positioned feet 31a. When the feet engage these chocks the chains are violently vibrated and this causes the potatoes to be freed of whatever earth may have adhered to them.

The legs 32a terminate just below the upper sprockets 25, but a plate 34, extending from side to side of the conveyor, continues from the legs and passes upwardly over the shaft 23 and downwardly on the rearward side of the conveyor for a short distance.

When each set of tines has, in consecutive order, arrived at a point directly over the upper sprockets the potatoes will have been unloaded therefrom, leaving the tines free to swing unrestrictedly except provision were made to prevent this occurring. The object of the plate 34 is to hold the tines in substantially the same position relative to the chains that they assumed when on their upward travel, this requirement being essential for the reason that they are employed in the actuation of the separator unit and must be more or less accurately positioned just previous to and while performing this operation. This feature will be dealt with in more detail later on.

Passing to the position of the set of tines marked A Fig. 10, when their duty in connection with the operation of the separator unit has been completed and they are on their way to the lower end of the elevating unit.

In this position, (A), the tines hang substantially perpendicularly and as they continue downwardly and arrive at position B (Fig. 6) a pawl 35 is engaged by the leg 31a of one of the tines and swings it inwardly into the position Bb, shown in dot and dash lines, and holds the tine until its free end passes the upper end of the arcuately bent angular member 36. When freed from the pawl it again assumes the perpendicular form until its end abuts on the leg 36a of the member 36, as shown in position C.

The pawl 35 is tensioned by a spring 37 and its movement in one direction is limited by a stop 38.

Continuing downwardly from position C the tines pass around the lower end of the conveyor positioned tangentially with respect to the sprocket wheels 27, shown at position D. It will be apparent that in this construction the conveyor can be operated nearer the surface of the ground than would be the case were the tines made to swing radially around the sprocket wheels.

From position D the tines are in a most advantageous position to pick up the earth, potatoes and potato-tops which, raised by the plowshare P, are deposited in the space immediately above the apron I.

As the tines pass around the lower shaft 27 the potatoes will collect on and between them but a greater portion of the earth will fall through the opening between the end of the apron I and the sprockets 27.

The manner in which the tines first present themselves to the potatoes in the elevating operation is a quite important characteristic of my invention.

The plowshare P scoops up everything in its path, and earth, rocks (if there are any), potatoes and potato-tops all pass in a body on the horizontally extended tines between which a large part of the earth is immediately sifted back on to the ground.

As the tines rise with the conveyor chains the potatoes are treated to a dirt-removing operation through the agitation of the chains as they pass the chocks 33, and the side plates Pa guard against lateral displacement of the potatoes from off the conveyor.

The depth to which the plowshare may be lowered into the ground is regulated by a ratchet lever 39 placed near the driver's seat and operably connected to the chain 40 and the eyebolt 40a.

Continuing from position E (Fig. 6) the tines finally reach the position F (shown in dot and dash lines Fig. 10). By this time the potatoes have mostly fallen forwardly on to the backs of the set of tines immediately in advance—which would place this set at position H (also shown in dot and dash lines). But as yet the potatoes are unable to pass through the opening 41. Upon the tines moving downwardly from position H the potatoes start to pass through the opening 41 and when the tines descend to position J the potatoes, with possibly rocks, will have all been discharged over the platform 42 on to the feed platform 43.

A hood 44, in the rear end of which is the opening 41, surrounds the upper end of the elevating conveyor, and the platform 42 is secured to this hood, just beneath the opening 41.

Extending across the interior space in the hood 44 are a plurality of flexible stripper fingers 45, secured to the hood at 46. They are placed in staggered relation to the tines and are for the purpose of detaching the tops from the potatoes as they pass over the upper end of the conveyor. Eventually the tops will be forced onwardly and carried by the tines to the point of dumping. The fingers are spring-like and will yield when an accumulation of the tops is carried forward by the positive action of the tines.

Across the opening 41 I mount another set of flexible fingers 45a quite similar to those just previously described. These fingers, 45a, prevent passage of the tops through the opening 41, and in some instances where the first set of fingers failed to remove all the potato tops, these are adapted to complete the operation. The fingers 45a are secured on the hood at 46a.

Secured on and disposed rearwardly of the vertical standards 12b is a bracket structure 47. Through the longitudinally positioned members of this bracket is mounted a shaft 48 on which are revolubly disposed two heart-shape plumb-plates 49, each having an arcuate opening 49a therein. Each plate has an opening 49b at its upper end and a shaft 50 is secured in these holes and extends from plate to plate.

On the lower portion of each plate 49 is a counter-weight 51 and on the side opposite a hole 52. In these holes 52 is secured a shaft 52a on which are revolubly mounted a plurality of separator fingers 53. These fingers have counter-weighted ends 53a and each is under tension of a spring 54.

The springs 54 hold the fingers, normally, against a stop member 55 mounted on an adjusting frame 56 the two arms 56a of which are pivoted, respectively, on the plates 49 at 57. A slot 49c in the plate 49, through which operates the thumb screw and nut 58 permits positioning the fingers 53 at various angles of inclination on the plates 49.

Fixed on the lower ends of the plates 49, by any suitable means, as for instance the angle member 59, is a deflector chute 60 having two faces 60a and 60b extending from plate to plate 49.

Inter-connecting and secured to the two plates 49 is the feed platform, hereinbefore referred to, 43. Rivets 61a passing through ears 61 extending downwardly from the feed platform secure the two plates 49 together so that they act as one.

Mounted to swing over the feed platform is a feed-box member shown in perspective in Fig. 11. The feed-box includes two hangers 63 each having a hole 63a for suspending the feed-box from shaft 50, and three sides 64a, 64b and 64c. On each hanger are two outwardly extending pins 65 which protrude through the openings 49a of the plates 49.

Two bell crank levers each having two arms 66 and 67 are mounted on and swing from the shaft 48. Inter-connecting the two arms 66 is a tie plate 68 and acting in association with each bell crank lever is a torsional spring 69 which normally hold the tie plate in contact with the lower end of the hood 44. The arms 67 operate, respectively, between the two sets of pins 65.

The frame members 4 of the harvester extend rearwardly of the wheels 9 and on them is secured a platform 70. Disposed on this platform are standards 71, braced by members 72. Vertically slidable on the standards are two yieldingly mounted bag-carrying devices each having a platform 73, two sides 74 and a back member 75 which, preferably, is of metal with a flanged top portion 75a.

In holes 76 in this flanged top operate, respectively, two rods 77 and encompassing each rod and extending from the top to the platform 70 is a compression spring 78.

Side cleats 79 secured, respectively, to the outer sides of the platform 73 stabilize and guide the bag-carrying devices as they are depressed when the bag B is being loaded with potatoes.

A cross plate 80 having rearwardly and downwardly directed portions 81 ties the top portions of the standards 71 together, and further provides support for the upper ends of the rods 77.

Attached to the portion 81 is a band 82 around which the open end of the bag is drawn before the operation of filling it with potatoes is started. To provide a quick acting device to bind the top of the bag on the member 82 I employ two levers 83 with broad, arcuate face ends 83a pivotally attaching the outer ends to the band member at 84, 84, respectively. When these levers are swung downwardly into engagement with the caught-up ends of the bag they act as toggles, securely holding the bag in their grasp.

The harvester might be equipped with but one of these bag-filling devices, but in order to make this operation of bag-filling continuous I prefer to have the machine carry two of them.

In Fig. 4a is shown a fragmentary plan view of the bagging end of the harvester. It will be observed that the deflector chute is of such width as to embrace the two bagging devices.

In operation, the attendant, provided he is to fill from the left-hand filling device, swings the gate 85 to the right, so that the potatoes in dropping toward the bag will be deflected toward the left-hand side of the chute; contrariwise, when filling from the right-hand device the gate is swung in the opposite direction—as indicated in dot and dash lines. The operator can thus attach one bag to the bagging apparatus while the other is automatically being filled with potatoes coming from the separator unit.

As will be observed by reference to Figs. 1, 14 and 15, the spring 78 holds the platform 73 in an elevated position at the start of the bag-filling operation, but as the potatoes accumulate in the bag their weight gradually depresses the spring and the platform with the bag descends; when filled it is fully straightened out. The object of this construction is to shorten the distance the potatoes are required to drop from the separator unit to the bag, reducing in a large measure the possibility of bruising them. For the convenience of the bagging operator I provide shelves 87 on which empty bags may be stored.

Before proceeding with a description of the operating features of my invention I wish to stress the fact that, while it includes three units, digging and elevating, separating, and bagging, it is, nevertheless primarily a single-purpose machine—a harvester. This means that by co-ordination and inter-relationship of the various elements composing the whole structure the potatoes in a potato field can, by the use of my apparatus, be put by one continuous and completed operation into immediate condition for marketing.

As the harvester enters a field planted with potatoes the operator drives the vehicle along each row, first lowering the plowshare which excavates the earth, potatoes and with them any rocks that may be in the ground and as the machine proceeds it forces this material over the top of the plowshare into the lower end of the elevating conveyor.

As the material proceeds up the conveyor practically all the earth is shaken from the potatoes, and as they continue to the top and pass thereover the potato-tops are detached from the potatoes. The potatoes and rocks continue to the discharge opening from the conveyor to the separator and finally are deposited in the feed-box.

As each set of tines engages, successively, the tie plate 68 (see position J of the tines) and continues on its downward course, the arms 66 of the bell crank levers are depressed until they reach a position shown in dot and dash lines Fig. 10, showing position K of the tines, in which position they are just at the point of releasing the arms 66, and when released they immediately return to their original position through the agency of the springs 69.

The movement which carried the arms 66 from their full line to their dotted line position has also brought the arms 67 forwardly. These arms (67) of the bell crank lever in association with the pins 65 in the feed-box hangers operate to advance the feed-box and this results in the potatoes being pushed off the edge of the feed platform 43 from which they fall to the separating fingers 53.

The feed fingers are very sensitively balanced by counterweighting and the action of the springs 54 is such that the fingers respond very quickly when impacted by any falling body.

Now a potato is more or less resilient and will, to a certain extent, rebound when dropped on to anything solid, whereas a rock is quite the reverse and has little or no springy qualities. Moreover the rock is heavier and when it falls on to the separator fingers the tendency is to keep on its course, instead of rebounding. And on this difference in character of the potato and rock is based the principle upon which I construct my separator finger mechanism.

The potato in impacting the fingers will depress them but there is a rebounding action which causes the potato to bounce as it falls and this is sufficient for it to clear the peak 60c of the deflector 60, slide along the face 60a and land in the bag B. The rock, on the other hand, being heavier than the potato strikes the fingers with a dull thud and instead of rebounding it causes the fingers to be further depressed. When it passes off the fingers the rock will either impact on the face 60b or pass directly to the ground, the latter being usually the case. It will be obvious that it is quite essential to maintain the correct angle of inclination of the fingers with respect to the perpendicular so that uniformity of conditions prevail at all times.

In other words, the angle of incidence between the falling potatoes and rocks and the face of the inclined fingers when once correctly established by adjustment of the arms 56a should be maintained regardless of the contour of the terrain over which the harvester is being transported.

It is for this reason that the plumb-plates 49 with their attached elements hang freely from the shaft 48 in a more or less pendulum-like manner, the counterweights 51 being employed to balance the assembly of parts so that they remain in a substantially constant state of perpendicularity with respect to any identifying mark, as for instance, the line 10—10, in Fig. 10. And although the bell-crank connection with the feed-box hangers 63 may cause a slight difference in the positions, relatively, of the feed-box and feed platform at certain times, this is immaterial insofar as maintaining correct positioning of the plumb-plates 49 is concerned.

Incidentally, it is the angle of deflection, or the direction in which the material rebounds after impacting the fingers which is material, and this must be ascertained by experiment.

While my apparatus is capable of being actuated by other than animal power, my object is to construct a machine of as low a cost as possible consistent with good workmanship, lack of complicated parts and so simple in operation that it is susceptible of use by ordinary, unskilled persons.

The embodiment herein disclosed is of course primarily illustrative, and my invention is obviously capable of interpretation in a wide variety of structures.

What I claim is:

1. A potato harvesting machine comprising in combination with a plowshare and two tractional wheels and an interconnecting axle fixed at its respective ends to said wheels, an inclined elevating conveyor including two transversely spaced endless link-belt chains, a plurality of sets of tines revolubly mounted on said chains, each set extending, in evenly spaced order, from one chain to the other, a separator mounted rearwardly of said conveyor, adapted to swing in a pendulum-like manner, said separator including a feed platform, a swinging feed-box superjacent said feed platform, a plurality of separator fingers pivotally and yieldingly mounted in said separator, a stop element, tensioning means adapted to normally hold said separator fingers in engagement with said stop element, and means co-acting with said tines to advance said feed-box.

2. A potato harvesting machine comprising in combination with two tractional wheels and an axle interconnecting and fixed to said wheels, a rearwardly inclined elevating conveyor including two transversely spaced endless sprocket chains, means interconnecting said conveyor and said axle whereby said conveyor may be actuated, a plurality of sets of tines on said chains pivotally secured thereon and adapted to swing on their pivotal points from substantially a normal presentment to said chains to a near parallel relation therewith, a feed platform, a feed-box swingingly mounted over said feed platform, means co-acting with said tines to actuate said feed-box, a plurality of transversely disposed pivotally mounted and yieldingly tensioned separator fingers inclined from horizontal and positioned below and forwardly of said feed platform, an inclined deflector chute, and holding means adapted to secure the open end of a bag to receive the potatoes as they fall from said deflector chute.

3. A machine for harvesting potatoes and the like comprising in combination with two tractional wheels and an interconnecting axle fixed, respectively, at its ends to said wheels, a rearwardly inclined elevating conveyor mounted to swing from said axle, said conveyor including two sprocket wheel drive chains disposed in spaced relation, one abreast of the other, elevating tines on said chains, an angular shape member extending substantially the full length and on both sides of said conveyor, an inwardly extending leg on each of said angular shape members along which said chains, respectively, are adapted to travel, chocks on said legs adapted to be engaged by said tines, a plate extending from the upper end of said angular shape member, around the upper end of said conveyor, and downwardly for a distance on the rearward end thereof, and power transmission means interconnecting said axle with said upper sprocket wheels whereby said conveyor may be actuated by the tractional effort of said wheels.

4. A machine for harvesting potatoes and the like, comprising in combination with two tractional wheels and an interconnecting axle fixed at its ends to said wheels, an elevating conveyor mounted to swing from said axle, said conveyor including two upper and two lower shaft-equipped sprocket wheels, two endless sprocket chains operable, respectively, on each mating pair of said sprocket wheels, a plurality of transversely aligning attachment links disposed at spaced intervals on said chains, an interconnecting bar revolubly mounted in each pair of transversely aligning attachment links, a plurality of elevating tines on each of said bars, a plurality of chain-interconnecting bars arranged on said chains in advance of said first mentioned bars, feet on said tines adapted, when said tines are operating on the tensioned side of said endless chains, to engage, respectively, the said second mentioned bars whereby the backward swing of said tines is limited when said tines are loaded, and means whereby said tines are made to swing forwardly and arrange themselves in a substantially horizontal manner when rounding the lower sprocket wheels of said conveyor.

5. A potato harvesting machine comprising in combination with a vehicle having two large rear tractional wheels, a rearwardly inclined elevating conveyor, including two upper and two lower sprocket wheels, two endless chains operating, respectively, over said upper and said lower sprocket wheels, a plowshare on the lower end of said conveyor adapted to excavate and deliver material to said conveyor, a plurality of sets of tines rotatively mounted at intervals on said conveyor chains, an arcuate apron on the lower end of said conveyor, rearwardly of said plowshare, and means to positively position said tines while rounding said lower sprocket wheels so that they are disposed tangentially to said sprocket wheels, the free ends of said tines being in advance of the points of connection with said chains.

6. A potato harvesting machine comprising in combination with a chassis frame, an axle rotatively mounted on said frame, two tractional wheels secured on said axle, an elevating conveyor mounted to swing from said axle, said conveyor including two endless chains, two upper and two lower sprocket wheels over which said chains are adapted to operate, a plurality of bars interconnecting and rotatively mounted on said chains, a plurality of elevating tines on each of said bars, angle members having their rear ends suspended and swinging from said axle and their forward ends secured to the lower end of said conveyor, a foot on said tines adapted to hold them from backward tilting when said chains are moving upwardly, an arcuately bent angle member to deflect said tines, as they pass around the lower end of said conveyor, and bring them into a substantially horizontal position when about to receive material to be elevated, and means to actuate said conveyor from power derived from said tractional wheels.

7. A potato harvesting machine comprising in combination with two tractional wheels and an interconnecting axle fixed at its ends to the respective wheels, an elevating conveyor including two pairs of sprocket wheels, one pair at the top and the other at the bottom end of said conveyor, two endless sprocket chains operating, respectively, on said two pairs of sprocket wheels, a plurality of sets of elevating tines swingingly mounted on and arranged in mutually spaced relation, transversely of said chains and embracing substantially the full width of said conveyor, a hood enclosing the upper end of said conveyor, and having a discharge opening in the rearward end thereof, a conveyor-supporting frame structure adapted to swing from said axle, a rearwardly extending bracket on said structure, a shaft mounted in said bracket, two plates swingingly mounted on said shaft, a feed platform interconnecting and secured to said plates, and means to conduct potatoes from said conveyor to said feed platform.

8. A potato harvesting machine comprising in combination with a chassis frame, two tractional wheels and an axle fixed to and interconnecting said wheels, a two-chain elevating conveyor, a frame structure supporting said conveyor and swingingly mounted on said axle, means interconnecting said conveyor and said axle whereby the actuation of said conveyor may be had, a plurality of sets of tines secured to said conveyor chains and susceptible of a limited amount of swinging movement thereon, a foot on each of said tines for the purpose of restricting its swinging movement in one direction, an angular member adapted to deflect said tines inwardly previously to and while rounding the lower end of said conveyor, the free ends of said tines being in advance, a hood surmounting said conveyor and having a discharge opening for material in its rearward end, a platform fixed to and extending rearwardly from said hood, a bracket extending rearwardly from said conveyor-supporting structure, a feed platform mounted on said bracket, means to maintain said feed platform in a substantially horizontal position, a feed-box mounted to swing superjacent said feed platform, and means to actuate said swinging feed-box through the agency of said tines.

9. A potato harvesting machine comprising a rearwardly inclined elevating conveyor including two transversely spaced endless link-belt chains, a plurality of bars revolubly mounted on and interconnecting at intervals the two said chains, a plurality of tines fixedly mounted on each of said bars, a bracket structure disposed rearwardly of said conveyor, a shaft on said bracket structure, two plumb-plates mounted on said shaft and free to swing in a pendulum-like manner therefrom, a counterweight on the lower portions of said plumb-plates, a feed platform interconnecting said plumb-plates, a feed-box suspended on said plates and adapted to swing over said feed platform, means whereby the tines on each of said tine-equipped bars cause said feed-box to advance as they, successively, pass downwardly with said chains, a retractile spring to return said feed-box after each advance movement, a plurality of inclined separator fingers pivotally mounted nearer one end than the other, said fingers being disposed below and forwardly of said feed platform, a counterweight on the short arm of each of said fingers, adapted to balance it on its pivoting point, a stop member against which the short arms of said fingers normally abut, and a spring adapted to exert a light tension on the short arms of said fingers and yieldingly hold them against said stop member.

10. A potato harvesting machine comprising a rearwardly inclined elevating conveyor including two transversely spaced endless chains, a plurality of sets of tines arranged at intervals on said chains, a hood, having a discharge opening therein, surmounting said conveyor, a shaft, two plumb-plates suspended to swing freely from said shaft and disposed rearwardly of said conveyor, a feed platform interconnecting said plumb-plates, a feed-box suspended to swing over said feed platform, a bell crank lever one arm of which is operably connected to said feed-box and the other arm adapted to swing into and out of the path of said tines as they descend with said chains, a plurality of pivotally and yieldingly mounted separator fingers disposed beneath and in the path of movement of material falling from said feed platform, means to re-position said separator fingers with respect to their angle of inclination from said feed platform, and a deflector chute interconnecting said plumb-plates and disposed therebeneath to receive material projected from said yieldingly mounted separator fingers.

11. A machine for harvesting potatoes and the like comprising a two-chain conveyor, a plurality of sets of tines arranged at intervals on said chains, two oscillatively mounted plumb-plates, a feed platform interconnecting said plumb-plates, a feed-box mounted to swing over said feed platform, means whereby potatoes elevated by said conveyor may be discharged therefrom and guided on to said feed platform, a plurality of stripper fingers positioned in said conveyor in transversely staggered relation to said tines, adapted to engage and detach the potato-tops from the potatoes as the latter are carried forward by said tines, means cooperating with said tines to positively advance said feed-box, yielding means to return said feed-box, a plurality of pivotally hung, yieldingly tensioned separator fingers, a deflector chute, two yieldingly mounted bag-supporting platforms beneath and in close proximity to said deflector chute, a bag-holding band disposed above each of said bag-holding platforms, and a toggle clamp arranged on said band to grip the top portion of the bag and bind it to said band while the bag-filling operation is proceeding.

WILLIAM G. BUNKER.